(12) United States Patent
Gretz

(10) Patent No.: US 10,431,970 B1
(45) Date of Patent: Oct. 1, 2019

(54) ELECTRICAL INSIDER FITTING FOR INTERNAL CONNECTION OF FLEXIBLE METAL CONDUIT TO AN ELECTRICAL BOX

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 15/231,297

(22) Filed: Aug. 8, 2016

Related U.S. Application Data

(63) Continuation-in-part of application No. 14/602,653, filed on Jan. 22, 2015, now Pat. No. 10,269,473.

(60) Provisional application No. 62/202,877, filed on Aug. 9, 2015.

(51) Int. Cl.
*H02G 3/22* (2006.01)
*H02G 1/00* (2006.01)
*H02G 3/08* (2006.01)

(52) U.S. Cl.
CPC .............. *H02G 3/22* (2013.01); *H02G 1/00* (2013.01); *H02G 3/083* (2013.01)

(58) Field of Classification Search
CPC ............ H02G 3/22; H02G 1/00; H02G 3/083
USPC ......................................... 174/660; 439/100
See application file for complete search history.

(56) References Cited

U.S. PATENT DOCUMENTS

| | | | | |
|---|---|---|---|---|
| 4,090,029 A | * | 5/1978 | Lundeberg | H02G 3/0616 174/51 |
| 4,494,779 A | * | 1/1985 | Neff | F16L 5/00 174/660 |
| 4,647,074 A | * | 3/1987 | Pate | F16L 3/1236 285/154.2 |
| 4,864,080 A | * | 9/1989 | Fochler | H02G 3/0691 174/664 |
| 4,990,721 A | | 2/1991 | Sheehan | |
| 5,171,164 A | * | 12/1992 | O'Neil | H01R 13/745 174/660 |
| 6,064,009 A | | 5/2000 | Jorgensen et al. | |
| 6,352,439 B1 | | 3/2002 | Stark et al. | |
| 6,521,831 B1 | | 2/2003 | Gretz | |
| 6,538,201 B1 | | 3/2003 | Gretz | |
| D473,783 S | | 4/2003 | Kiely | |
| 6,596,939 B1 | | 7/2003 | Gretz | |
| D479,984 S | | 9/2003 | Kiely | |
| 6,682,355 B1 | | 1/2004 | Gretz | |
| 6,767,032 B1 | | 7/2004 | Gretz | |

(Continued)

*Primary Examiner* — Timothy J Thompson
*Assistant Examiner* — Rhadames Alonzo Miller

(57) ABSTRACT

An electrical insider fitting for connecting flexible metal conduit to an electrical box without disrupting the walls surrounding the box. The fitting includes a connector body with a leading end, a trailing end, and a nose portion. A resilient split snap ring on the fitting enables snap connection of the fitting to the interior wall of an electrical box. Discontinuous threads on the nose portion are adapted to grab and hold a flexible metal conduit to the box. Conductors from the attached flexible metal conduit feed through the interior bores of the fitting to the interior of the electrical box enabling an installer to complete electrical connections in order to supply voltage to any components within the box.

13 Claims, 8 Drawing Sheets

(56) References Cited

U.S. PATENT DOCUMENTS

| | | | |
|---|---|---|---|
| 6,935,891 B2 * | 8/2005 | Kiely | H01R 4/363 439/535 |
| 7,045,714 B1 | 5/2006 | Kiely | |
| 7,151,223 B2 | 12/2006 | Auray et al. | |
| 7,238,894 B1 * | 7/2007 | Gretz | H02G 3/0666 16/2.1 |
| 7,374,212 B1 | 5/2008 | Gretz | |
| 7,485,806 B1 | 2/2009 | Gretz | |
| 7,723,623 B2 | 5/2010 | Kiely et al. | |
| 7,841,630 B1 | 11/2010 | Auray et al. | |
| 7,854,627 B1 * | 12/2010 | Gretz | 439/557 |
| 8,274,000 B2 | 9/2012 | Smith | |
| 8,466,378 B1 * | 6/2013 | Gretz | H02G 3/0616 174/552 |
| 8,487,197 B2 | 7/2013 | Smith | |
| 9,252,577 B1 | 2/2016 | Smith | |
| 9,257,795 B2 | 2/2016 | Smith | |
| 9,293,000 B2 | 3/2016 | Gretz | |
| 9,343,883 B2 | 5/2016 | DeCesare et al. | |
| 9,373,919 B1 | 6/2016 | Smith | |
| 9,490,619 B2 | 6/2016 | Gretz et al. | |
| 2004/0046385 A1 * | 3/2004 | Shemtov | F16L 25/08 285/139.1 |
| 2004/0166708 A1 * | 8/2004 | Kiely | H01R 4/363 439/92 |
| 2004/0177988 A1 * | 9/2004 | Kiely | H02G 3/0691 174/656 |
| 2008/0118216 A1 * | 5/2008 | Riley | G02B 6/4459 385/136 |
| 2013/0189860 A1 * | 7/2013 | Pyron | H01R 4/30 439/100 |

\* cited by examiner

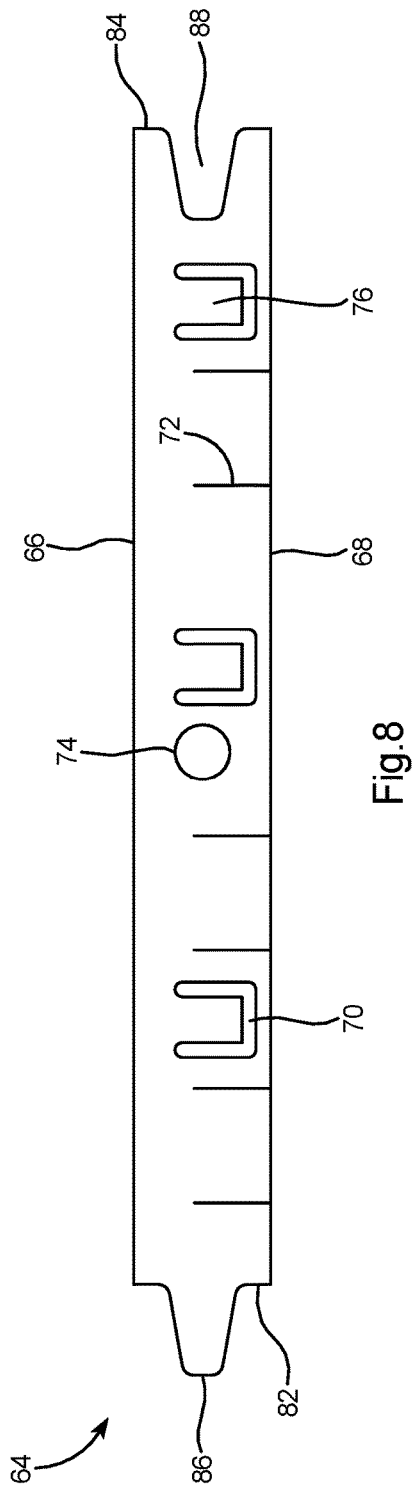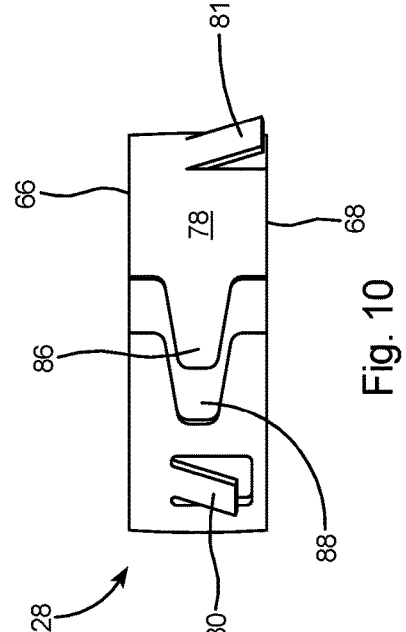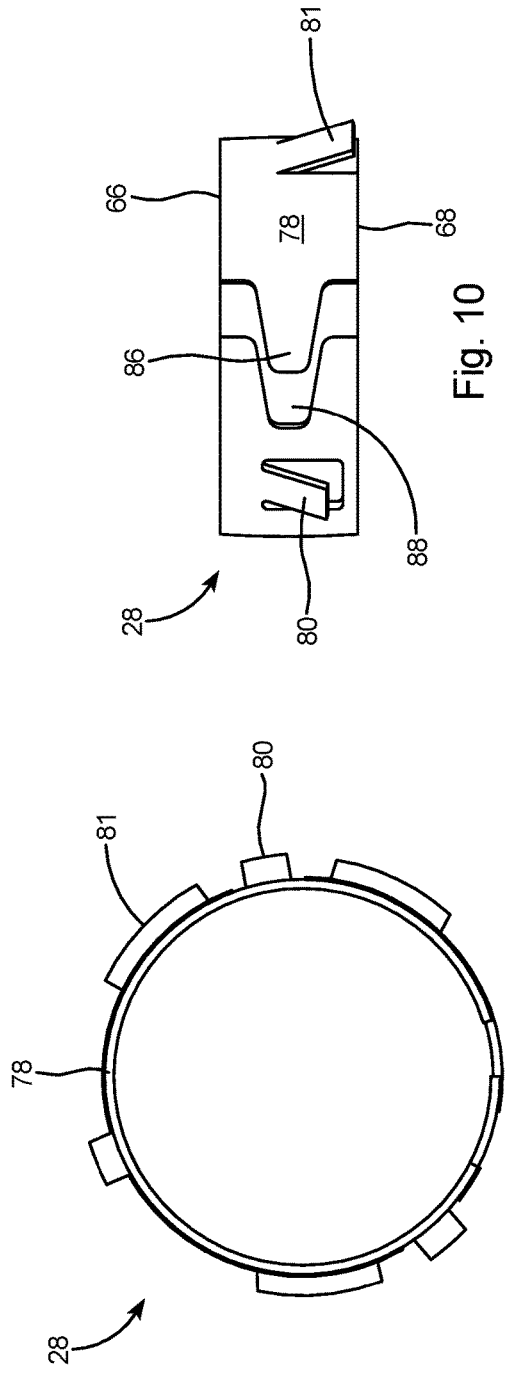

US 10,431,970 B1

ELECTRICAL INSIDER FITTING FOR INTERNAL CONNECTION OF FLEXIBLE METAL CONDUIT TO AN ELECTRICAL BOX

This application claims priority to provisional U.S. Application No. 62/202,877, filed Aug. 9, 2015, and is a Continuation-In-Part of patent application Ser. No. 14/602,653, titled "Electrical Insider Fitting for Internal Connection to an Electrical Box", filed on Jan. 22, 2015, the contents of which are herein incorporated by reference in their entirety.

FIELD OF THE INVENTION

This invention relates to connection of electrical supply to an electrical box and more specifically to an electrical fitting for connection of flexible metal conduit to an electrical box.

BACKGROUND

Electrical fittings are commonly used to connect electrical cables and flexible conduit to electrical boxes. Conventional electrical fittings are usually attached to the electrical box from the outside of the box.

Conventional electrical fittings are typically connected to the exterior wall of an electrical box. In an old work situation, the outside of the electrical box is typically nested within the surrounding wall, and, in order to connect the conventional electrical fitting, the drywall surrounding the box must be removed and replaced, causing extended time for removing and reinstalling the drywall and replacing or repairing the wall surface. Thus, because of the extensive wall disruption and lengthy time to repair the wall, conventional electrical fittings are not ideally suited for connection of cable and flexible conduit to an old work electrical box.

Accordingly, what is needed is an electrical fitting and method that enables securing flexible metal electrical conduit to an electrical box but eliminates the need to remove and subsequently repair the wall surrounding the box.

BRIEF SUMMARY OF THE INVENTION

The current invention is an electrical insider fitting for connecting flexible metal conduit to an electrical box. The insider fitting is secured to the inside wall of an electrical box thereby enabling an installer to connect a flexible metal conduit without disrupting the structural walls surrounding the box. The tubular insider fitting includes a connector body with a leading end, a trailing end, and a nose portion at the leading end. A trailing flange and a mid-body flange define a seat on the trailing end of the connector body. A resilient split snap ring is adapted to fit onto the seat. The snap ring enables snap connection of the fitting to the interior wall of an electrical box until the mid-body flange seats against the electrical box wall and nose portion extends through the outer wall of the box. Discontinuous thread portions on the nose are adapted to grab and hold a flexible metal conduit to the box. Conductors from the attached flexible metal conduit feed through the interior bores of the fitting to the interior of the electrical box enabling an installer to complete electrical connections to supply voltage to any components within the box.

OBJECTS AND ADVANTAGES

A first object of the current invention is to provide an electrical fitting that enables flexible metal conduit to an electrical box or panel.

A second object of the invention is to provide an electrical fitting that creates secure grounding of flexible metal conduit to the fitting and to an electrical box or panel.

A further object of the invention is to provide an electrical fitting with discontinuous or discreet thread portions for making a secure grounded connection to a flexible metal conduit.

Another object of the invention is to provide an electrical fitting with that connects to the inside of an electrical box to eliminate the disruption and subsequent required repairs to the wall surfaces surrounding the box.

BRIEF DESCRIPTION OF THE SEVERAL VIEWS OF THE DRAWING(S)

Reference is made herein to the accompanying drawings, which are not necessarily drawn to scale, and wherein:

FIG. 8 is a plan view of a blank that is used to form a snap ring that forms a portion of the electrical insider fitting of FIG. 1.

FIG. 9 is an end view of the snap ring that is formed from the blank depicted in FIG. 8.

FIG. 10 is a side view of the snap ring.

DETAILED DESCRIPTION

Figure 1:
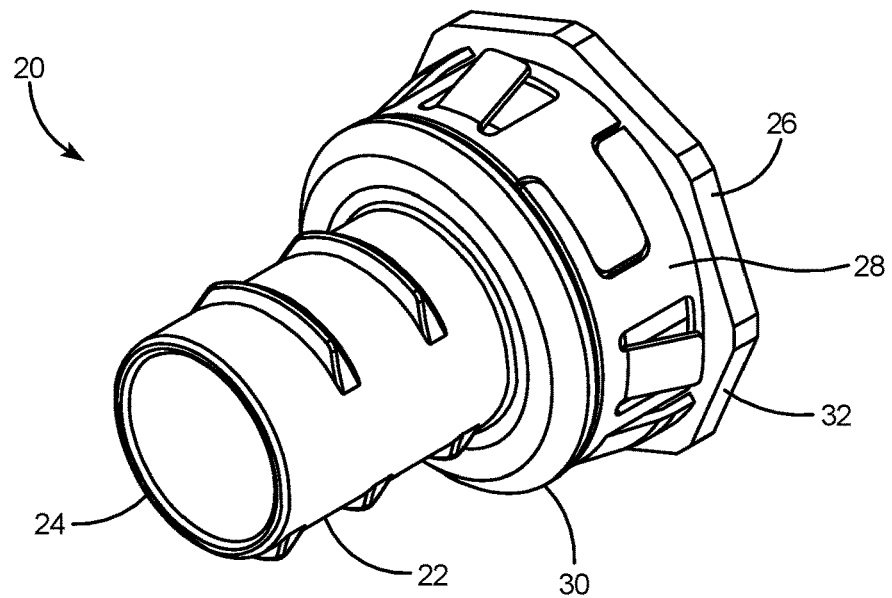
FIG. 1 is an isometric view of a first and preferred embodiment of an electrical insider fitting for flexible metal conduit in accordance with embodiments of the current invention.
Figure 2:
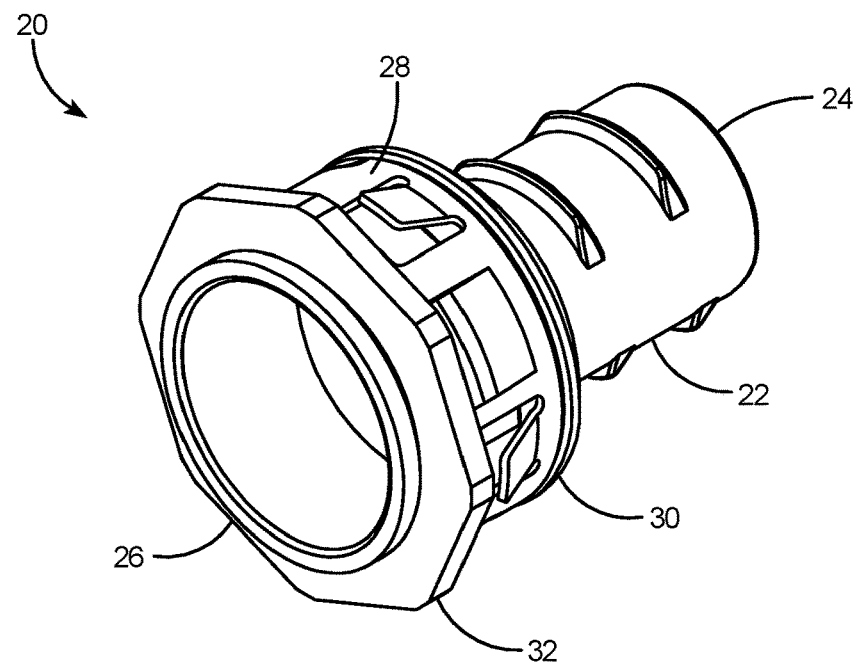
FIG. 2 is an isometric view of the electrical insider fitting from the opposing end as shown in FIG. 1.

With reference to FIGS. 1 and 2, the present invention comprises an electrical insider fitting 20 for connecting flexible electrical conduit to an electrical box. The insider fitting 20 includes a tubular connector body 22 having a leading end 24 and a trailing end 26. The term "leading end" as used herein refers to the end of the fitting that is inserted through the access hole in an electrical box and the term "trailing end" refers to the opposing end of the fitting that is not inserted through the access hole of the electrical box. A snap ring 28 is disposed between the mid-body flange 30 and trailing flange 32 on the connector body 22.

Figure 3:
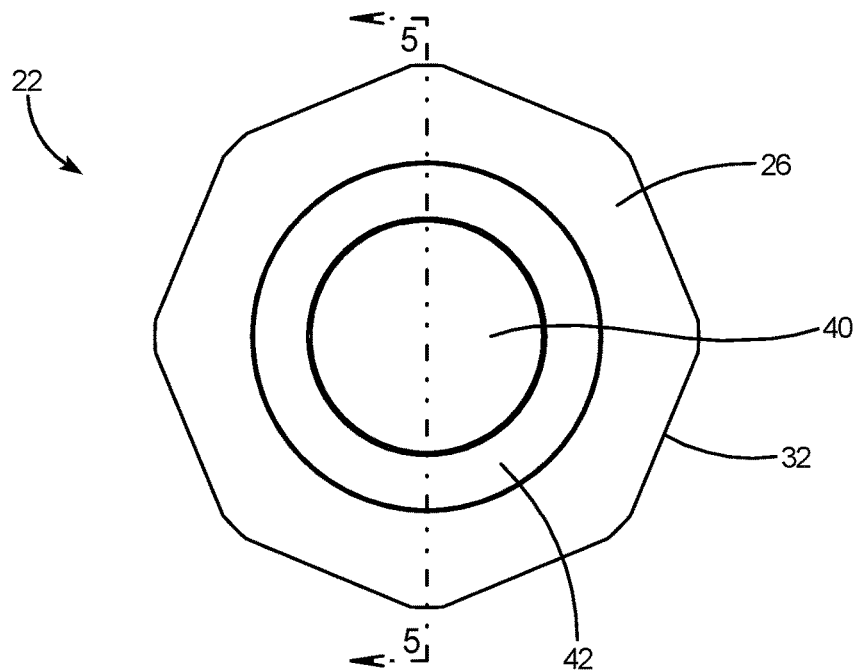
FIG. 3 is an end view of a connector body that forms a portion of the electrical insider fitting of the present invention.
Figure 4:
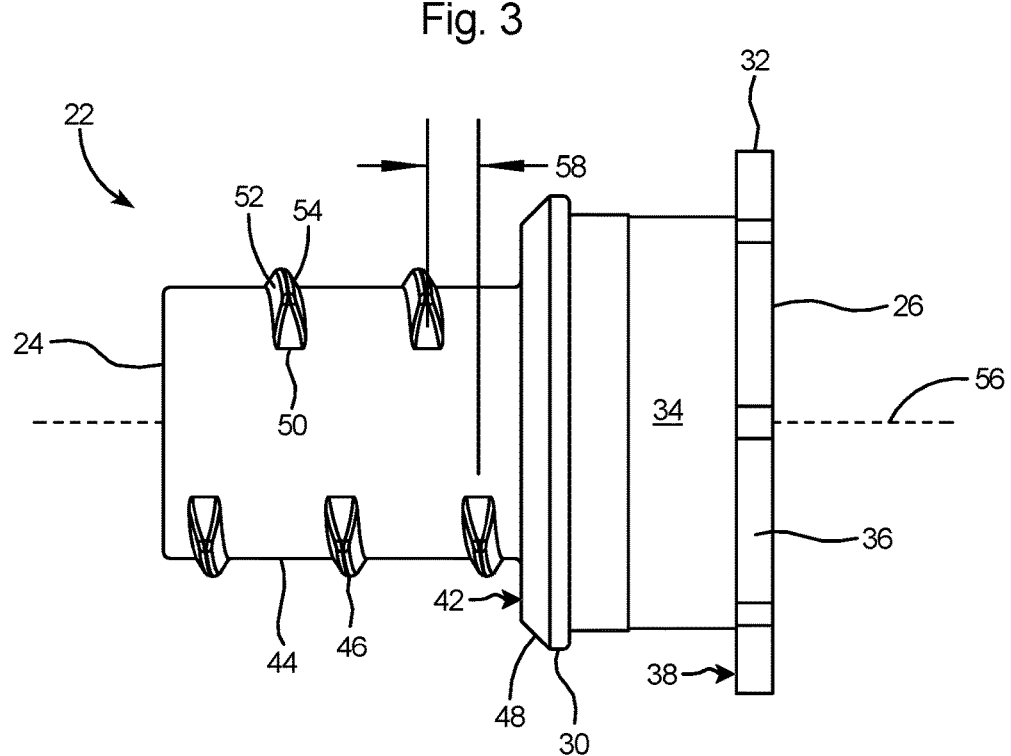
FIG. 4 is a side view of the connector body.

Referring to FIGS. 3 and 4, the mid-body flange 30 and trailing flange 32 define a seat 34 at the trailing end 26 of the connector body 22. Trailing flange 32 includes a plurality of flats 36 on its outer edge and an abutment surface 38. A leading bore 40 extends through the connector body and an inner abutment surface 42 surrounds the leading bore 40. The connector body includes a nose portion 44 extending from the mid-body flange 30 and a plurality of thread portions 46 extending from the nose portion. A beveled edge 48 is provided on the leading end of the mid-body flange 30. Beveled edge 48 will facilitate insertion of a snap ring (not shown) over the mid-body flange 30 to form the electrical insider fitting of the invention.

As shown in FIG. 4, thread portions 46 include flat end portions 50, leading sides 52, and trailing sides 54. Trailing flange 32 extends to a greater distance from the axial center 56 of the connector body 22 than does the mid-body flange 30 and thus trailing flange is of a larger diameter than the mid-body flange. The thread portions 46 are preferably offset longitudinally along the nose portion 44, as shown by the thread center-to-center offset 58 in FIG. 4.

Figure 5:
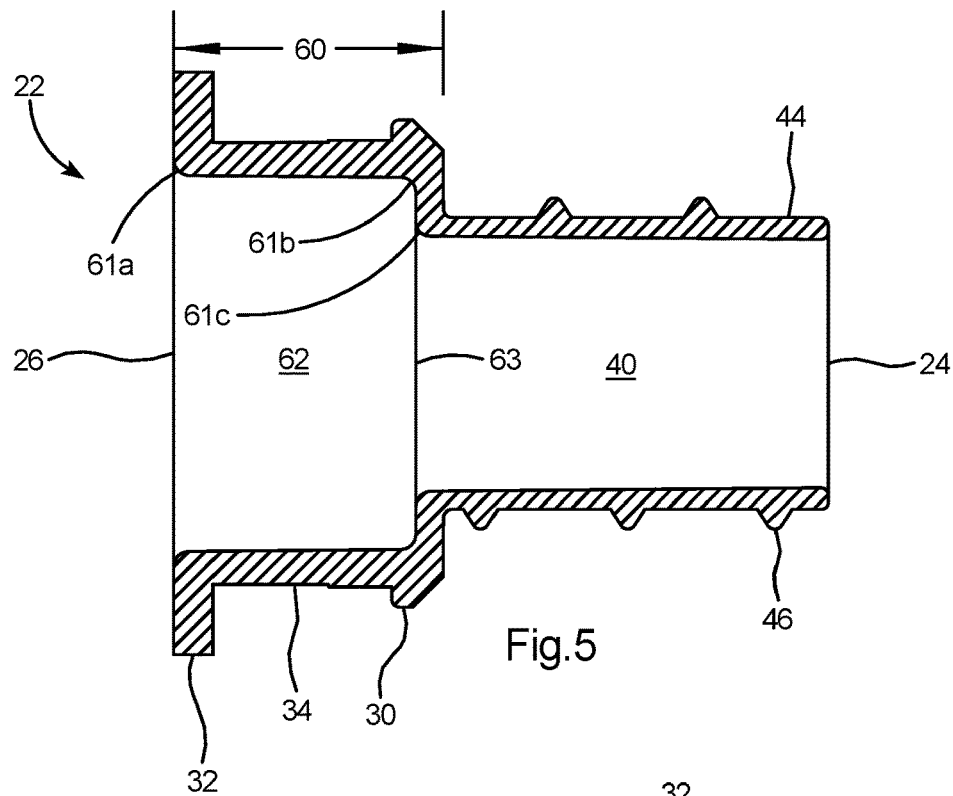
FIG. 5 is a sectional view of the connector body taken along line 5-5 of FIG. 3.
Figure 11:
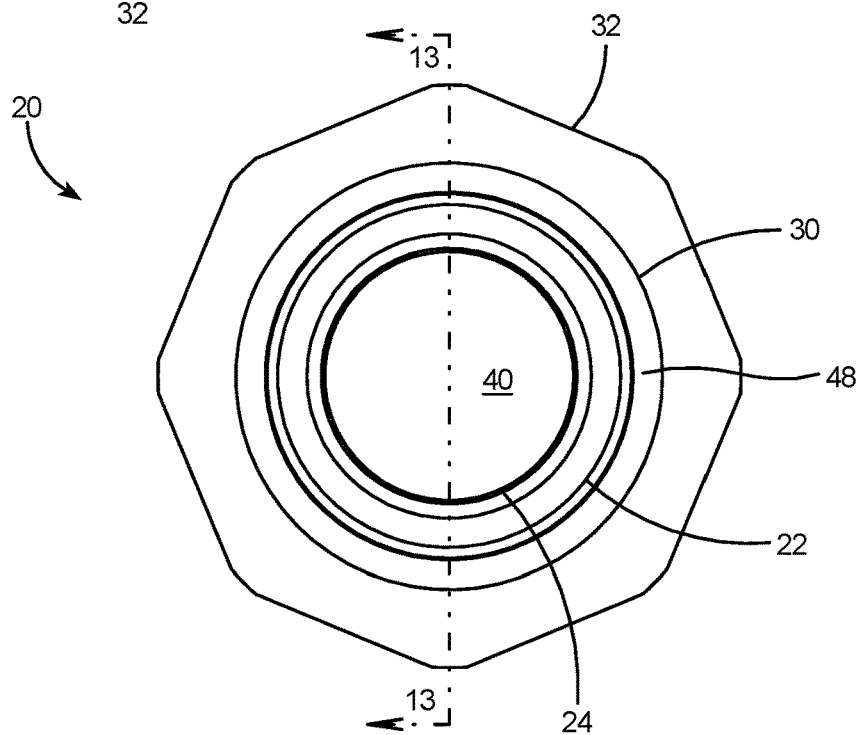
FIG. 11 is an end view of the electrical insider fitting.
Figure 6:
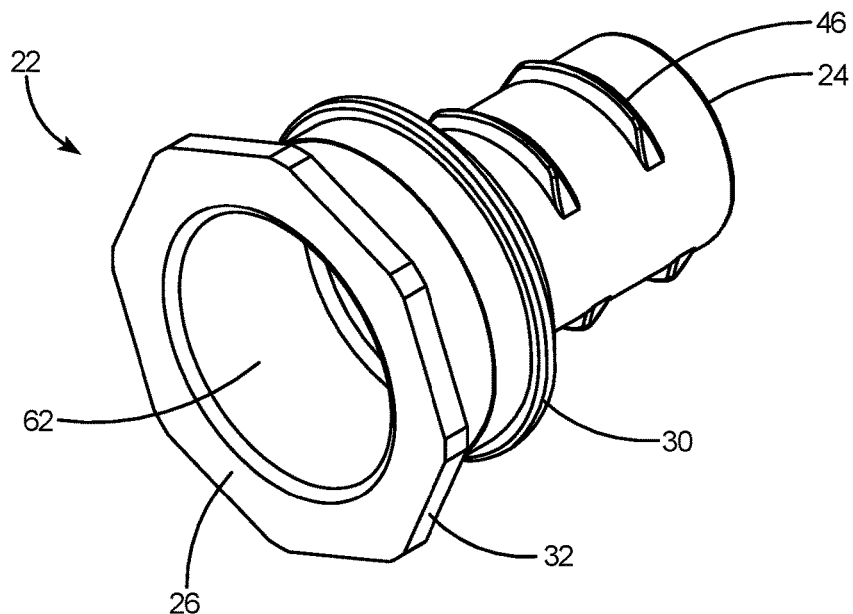
FIG. 6 is an isometric view of the connector body as viewed from the trailing end.
Figure 7:
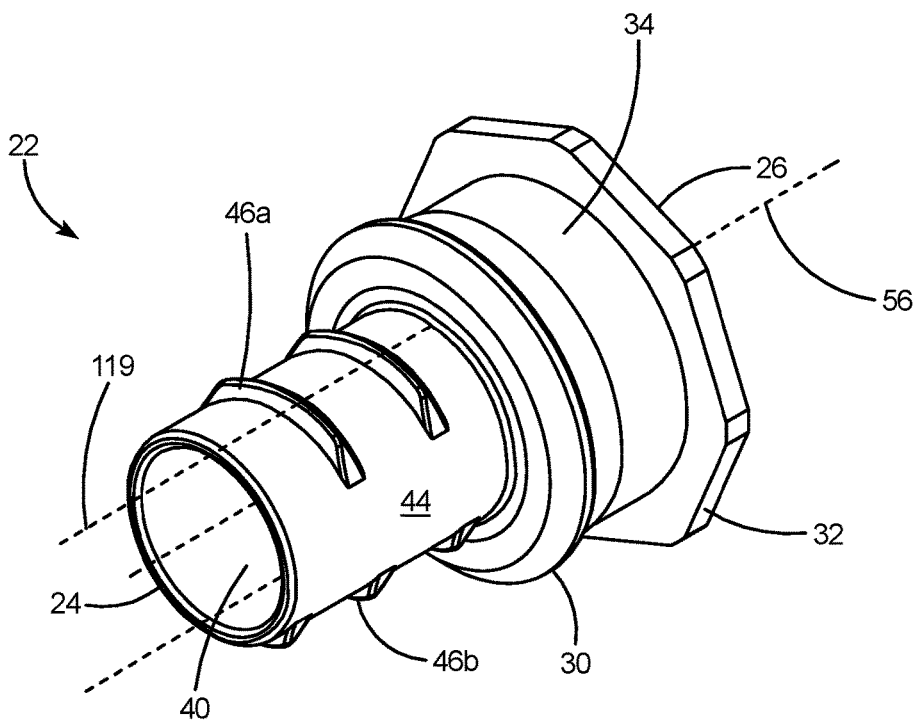
FIG. 7 is an isometric view of the connector body as viewed from the leading end.

With reference to FIGS. 5-7, preferably the connector body 22 is of one-piece construction (see FIG. 5), and most preferably is die-cast of metal alloy. Leading bore 40 extends through the nose portion 44 and the connector body 22 includes a trailing portion 60 that includes seat 34, the mid-body flange 30, and the trailing flange 32. Trailing portion 60 includes a wide trailing bore 62 therein. Trailing bore 62 is of larger diameter than the leading bore 40. As shown in FIG. 5, trailing bore 62 of connector body 22 includes an arcuate outer corner 61a, an arcuate inner corner 61b, and a second arcuate outer corner 61c at the transition 63 from leading bore 40 to trailing bore 62.

Referring to FIGS. 8-10, the snap ring 28 is preferably formed from a flat blank 64 of resilient metal as shown in FIG. 8. The flat blank 64 includes a leading edge 66 and a trailing edge 68. A plurality of U-shaped slots 70 are included on the blank 64 along with a plurality of slits 72 extending laterally from the trailing edge 68 across a portion of the blank. An aperture 74 in the blank provides a means for affixing the blank in a mandrel (not shown), for forming the blank 64 into the tubular snap ring 28 of FIGS. 9-10. The U-shaped slots 70 define a plurality of tabs 76 that, when bent outward of the tubular body 78 of the snap ring 28, define locking tangs 80 spaced around the outer periphery of the snap ring tubular body 78. The slits 72 define grounding tangs 81 along the trailing edge of the snap ring 28. The blank 64 includes a first end 82 and second end 84 with a tab 86 at the first end 82 and a groove 88 in the second end 84. When formed into the tubular snap ring 28, the tab 86 extends substantially to the groove 88. The split ring arrangement enables the snap ring to expand in diameter as it is slipped over the mid-body flange 30 in order to form the electrical insider fitting assembly 20 of the present invention.

Figure 12:
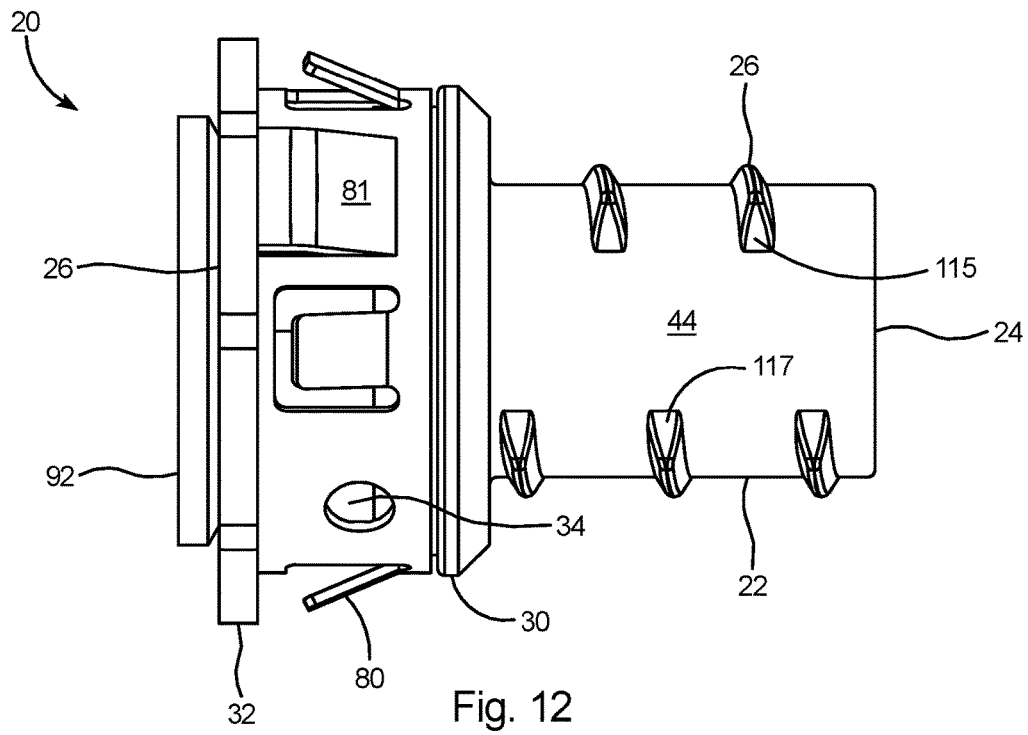
FIG. 12 is a side view of the electrical insider fitting.
Figure 13:
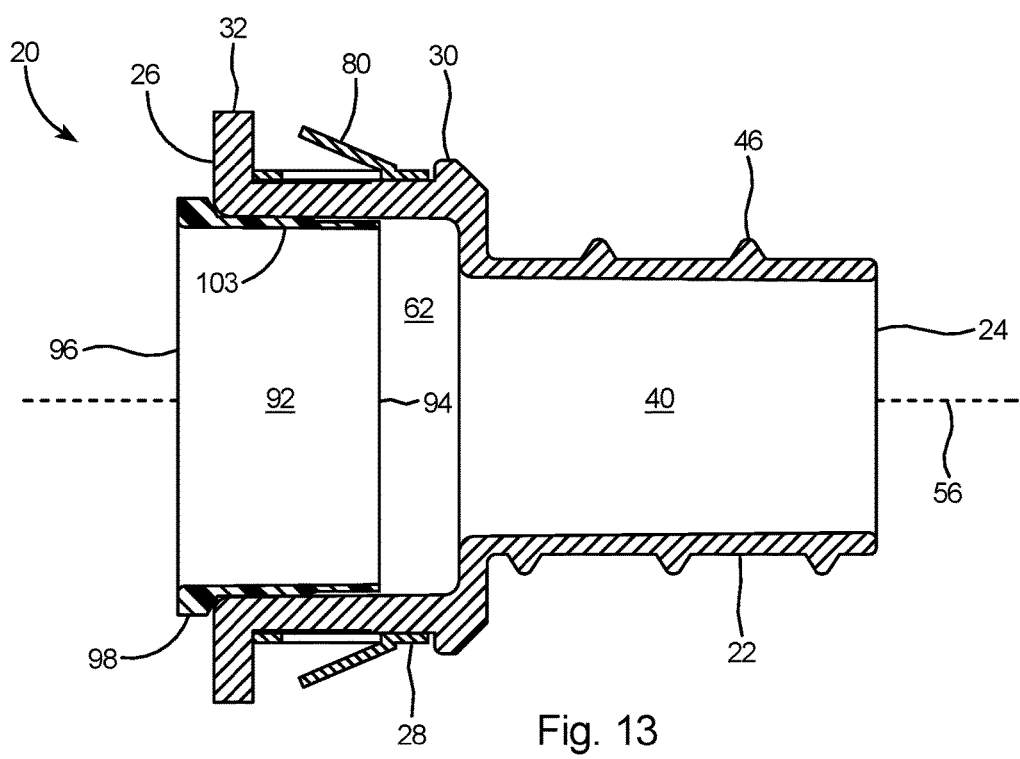
FIG. 13 is a sectional view of the electrical insider fitting taken along line 13-13 of FIG. 11.

With reference to FIGS. 12-13, the fully assembled electrical insider fitting 20 includes the snap ring 28 disposed on the seat 34 at the trailing end 26 of the connector body 22. Locking tangs 80 on the snap ring 28 extend toward the trailing end 26 and terminate in a free end 90. The thread portions 46 extend from the nose portion 44 at the leading end 24 of the connector body 22.

As shown in FIGS. 12-13, an optional throat liner 92 may be inserted in the trailing bore 62 at the trailing end 26 of the connector body 22. Tubular throat liner 92 includes a leading end 94, a trailing end 96, and a flange 98 with an abutment surface 101 on the trailing end 96. The throat liner 92 is preferably constructed of plastic and, if used, is inserted in the trailing bore 62 until abutment surface 101 of flange 98 of throat liner 92 contacts trailing flange 32 of connector body 22. As shown in FIG. 13, leading end 94 of throat liner 92 extends at least partially into trailing bore 92 of connector body 22. When inserted within the trailing bore 92, the wall 103 of throat liner 92 is well clear of the axial center 56 of the connector body 22.

Figure 14:
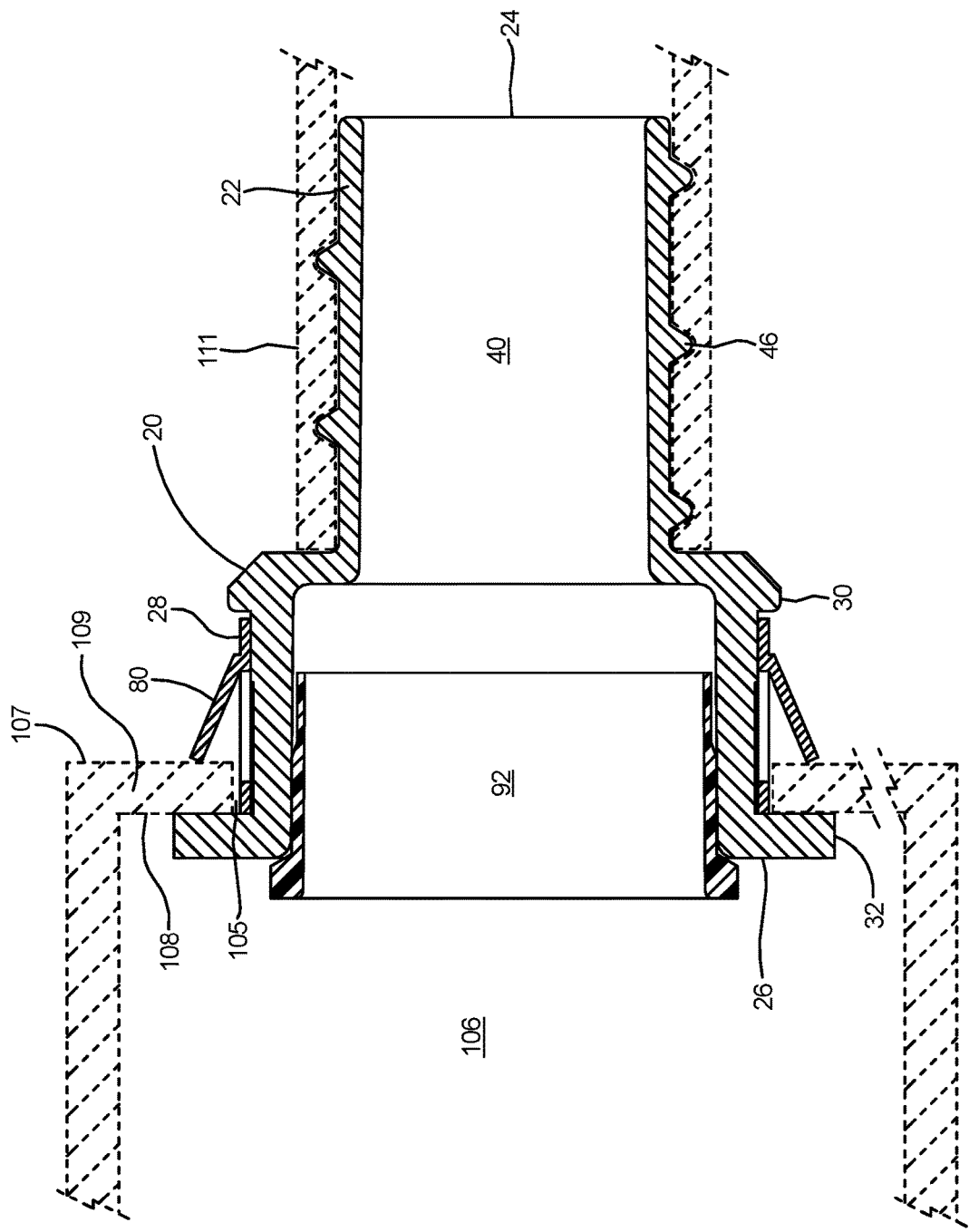
FIG. 14 is a sectional view of the electrical insider fitting secured to an electrical box and with a flexible conduit attached to the fitting.

With reference to FIG. 14, to operate the invention, the electrical insider fitting 20 is inserted within an access hole 105 of electrical box 107 from inside the box until trailing flange 32 contacts the inside surface 108 of the electrical box 107. Leading end 24 of fitting 20 is inserted until locking tangs 80 of snap ring 28 slip through the access hole and, after being clear of the electrical box wall 109, snap outwards to engage the wall. Locking tangs 80 thus hold electrical fitting securely to the electrical box and maintain a grounding path between the fitting 20 and the electrical box 107. Flexible electrical conduit 111 can then be threaded onto the leading end 24 of the electrical insider fitting 20. As the flexible metal conduit 111 is threaded straightforward onto the nose portion 44 of the fitting 20, the thread portions 46 bite into the inside wall of the conduit to and secure it to the fitting and box. As the flexible metal conduit 111 is threaded onto the nose portion 44, conductors (not shown) from the electrical conduit 111 pass through the conduit and the electrical insider fitting 20 to supply electrical current to any electrical components (not shown) mounted inside the electrical box. After the flexible metal conduit 111 is affixed to the nose portion 44 of the fitting, the fitting establishes a proper ground grounding path between the fitting, the flexible metal conduit 111, and the electrical box 107.

As shown in FIG. 12, the thread portions 46 are preferably discontinuous, or discreet thread portions, on the nose portion 44 with a first end ramp 115 and second end ramp 117 on each thread portion 46. The discontinuous and widely spaced threads portions 46 enable easy yet secure connection of the conduit to the nose portion 44 of the fitting without creating too restrictive a fit and impeding the advancement of the flexible metal conduit 111 (see FIG. 14) onto the fitting 20.

With reference to FIG. 7, two discreet sets of threads 46a and 46b are provided on opposing sides of the nose portion, or substantially at 180 degrees from one another on the tubular nose portion 44, including a first set of threads 46a and a second set of threads 46b. A first set of threads 46a is linearly aligned along one side of the tubular nose portion 44 and a second set of threads 46b is linearly aligned along an opposing side of the tubular nose portion. Each set of threads 46a and 46b are aligned along an axis 119 that is parallel to the central axis 56 of the fitting.

Figure 15:
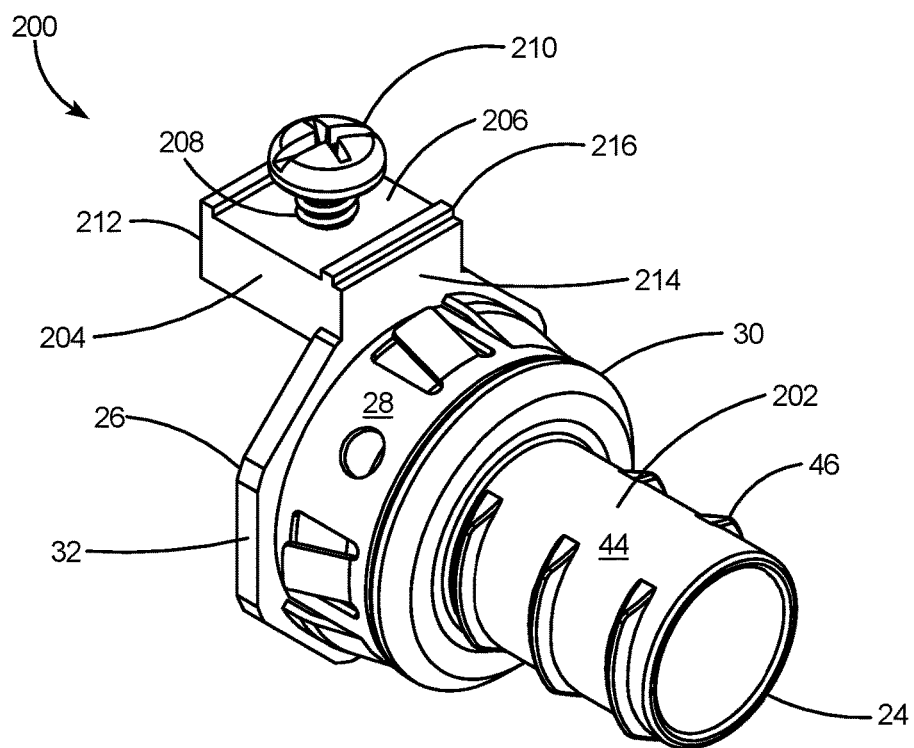
FIG. 15 is an isometric view of a second embodiment of an electrical insider fitting for flexible metal conduit as viewed from the leading end.
Figure 16:
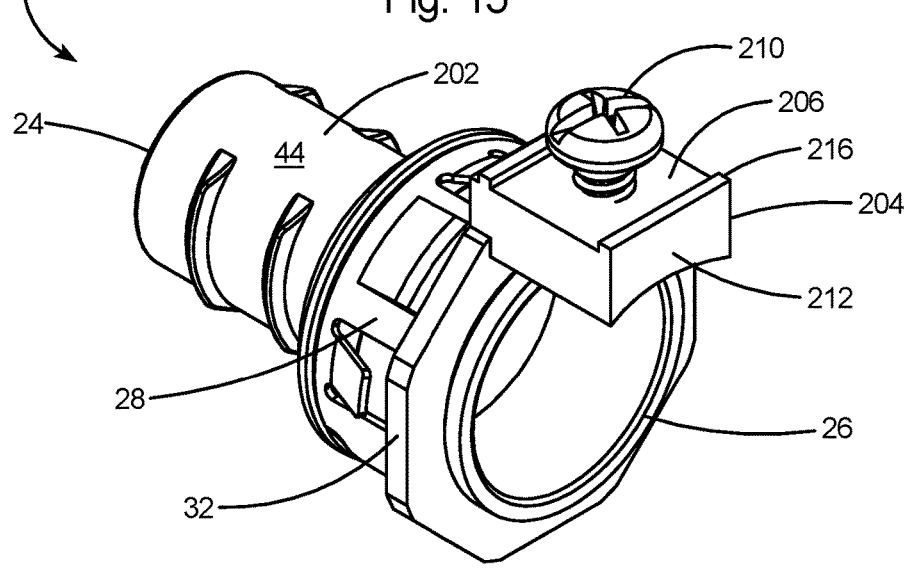
FIG. 16 is an isometric view of the electrical insider fitting as viewed from the trailing end.

With reference to FIGS. 15 and 16, there is shown a second embodiment of the electrical insider fitting 200 for connecting flexible electrical conduit to an electrical box. Electrical insider fitting 200 includes a connector body 202 with a ground lug 204 extending from the trailing flange 32. Ground lug 204 includes a recessed area 206 with an aperture 208 and a screw 210 threaded into the aperture. Ground lug 204 includes a trailing end 212, a leading end 214, and a rail 216 extending along the trailing end and leading end of the recessed area 206. Recessed area 206 is adapted to accept connection of a ground wire or a clip (not shown) extending from the ground wire for the purpose of further grounding the fitting 200 to a flexible metal conduit.

Preferably, the connector body is die-cast of metal in one-piece. Most preferably the connector body is die-cast of zinc alloy. Most preferably, the snap ring of the present invention is constructed of spring steel.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electrical insider fitting for connecting electrical conduit to an electrical box, comprising:
   a connector body including a leading end for insertion through an access hole in the electrical box and a trailing end;
   a nose portion on said leading end of said connector body;
   a trailing flange on said trailing end of said connector body and a mid-body flange defining a seat on said trailing end of said connector body;
   a snap ring residing in said seat on said trailing end of said connector body;
   thread portions on said nose, said thread portions for engaging the interior surface of the electrical conduit; and
   said trailing flange is of a greater diameter than said mid-body flange.

2. The electrical fitting of claim 1, further comprising a leading bore within said nose portion of said connector body.

3. The electrical fitting of claim 1, further comprising:
   a trailing portion on said connector body; and
   a trailing bore within said trailing portion.

4. The electrical fitting of claim 1, wherein said thread portions on said nose are discontinuous thread portions.

5. The electrical fitting of claim 1, further comprising a first end ramp and a second end ramp on said thread portions.

6. The electrical fitting of claim 1, wherein said thread portions include two discreet sets of thread portions on opposing sides of the nose portion.

7. The electrical fitting of claim 6, wherein said discreet sets of thread portions reside at 180 degrees from one another on said nose portion.

8. The electrical fitting of claim 7, wherein said discreet sets of thread portions include a first set of threads and a second set of threads.

9. The electrical fitting of claim 8, wherein said wherein said first set of threads is linearly aligned along one side of said nose portion; and
   said second set of threads is linearly aligned along an opposing side of the tubular nose portion.

10. The electrical fitting of claim 9, wherein
    said fitting includes a central axis; and
    each of said sets of threads is aligned along an axis that is parallel to the central axis of the fitting.

11. The electrical fitting of claim 1, wherein said snap ring further comprises:
    a tubular body having an outer periphery; and
    a plurality of U-shaped slots.

12. The electrical fitting of claim 11, wherein said U-shaped slots define a plurality of locking tangs spaced around the outer periphery of said tubular body of said snap ring.

13. The electrical fitting of claim 1, wherein said snap ring further comprises:
    a trailing edge;
    a plurality of slits extending laterally from the trailing edge; and
    said slits defining grounding tangs along said trailing edge of said snap ring.

* * * * *